March 6, 1945. W. K. LEWIS Re. 22,612
PROCESS FOR TREATING HYDROCARBON OILS WITH LIGHT HYDROCARBONS
Original Filed Aug. 10, 1934
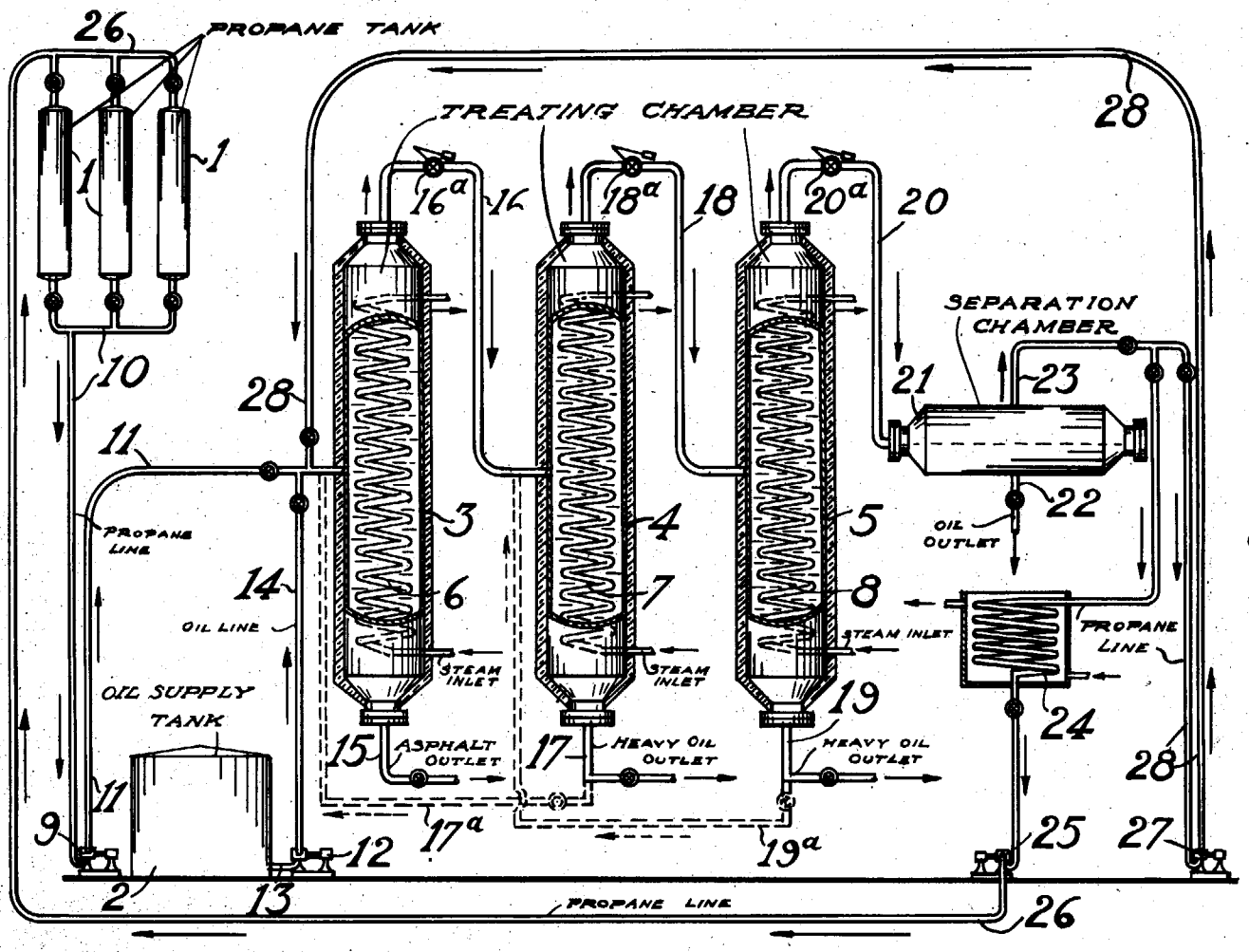
Warren K. Lewis Inventor
By W. E. Currie Attorney Reissued Mar. 6, 1945

Re. 22,612

UNITED STATES PATENT OFFICE 22,612

PROCESS FOR TREATING HYDROCARBON OILS WITH LIGHT HYDROCARBONS

Warren K. Lewis, Newton, Mass., assignor to Standard Oil Development Company, a corporation of Delaware Original No. 2,284,583, dated May 26, 1942, Serial No. 739,226, August 10, 1934. Application for reissue May 4, 1943, Serial No. 485,682

24 Claims. (Cl. 196—13)

This invention relates to the treatment of hydrocarbon oils with light hydrocarbons and is more particularly concerned with the treatment of hydrocarbon oils with light hydrocarbons at or above the critical temperatures of the light hydrocarbons.

It has been found that light hydrocarbons have a selective action on hydrocarbon oils, that is to say, are capable under suitable conditions of separating hydrocarbon oils into fractions of dissimilar molecular weight and/or other characteristics. It has also been found that the selective solvent action of the light hydrocarbons depends to a large extent on the density thereof during the treatment.

It has now been found that particularly advantageous results may be obtained by treating hydrocarbon oils with light hydrocarbons at or above the critical temperatures of the light hydrocarbons and varying the pressure maintained at these temperatures to obtain changes in the density of the liquid phase. Thus, although a light hydrocarbon alone cannot be liquefied at its critical temperature or above, under any pressure, it has been found that if oil is present with the light hydrocarbon, an increase of pressure at temperatures at or above the critical temperature of the light hydrocarbon will cause the latter to dissolve in the oil and thus force it into the liquid phase. As the pressure is increased more and more of the light hydrocarbon will dissolve in the oil with the result that the dissolved light hydrocarbon may then exert a selective solvent action on the oil and cause it to be separated into two phases.

At the critical temperature and the equilibrium vapor pressure of the light hydrocarbon at just below its critical temperature, insufficient light hydrocarbon will be dissolved in the oil and consequently there will be no separation of the oil into two phases. On the other hand, at the critical temperature and some pressure substantially above the critical pressure, a substantial portion of the light hydrocarbon will be dissolved in the oil so that a separation into two liquid phases can occur.

It will be understood that the greater the proportion of light hydrocarbon to oil in the liquid phase, the greater will be the amount of oil in the upper liquid layer, so that if sufficient light hydrocarbon is used, substantially all of the oil will be in the one layer (top liquid) under conditions such that all of the liquefied hydrocarbon is dissolved in oil.

The term "hydrocarbon oil" as used herein will be understood to include gas oils, lubricating oils, heavy gear oils, residues, wax-containing distillates or residues and the like whether obtained by the distillation, destructive distillation, hydrogenation, destructive hydrogenation, or cracking of petroleum, shales, coals, mineral oils, tars, pitches, bitumens and the like or by synthetic processes such as polymerization, condensation or voltolization of gaseous, liquid or solid hydrocarbons.

The term "light hydrocarbons" will be understood to include hydrocarbons having 1 to 8 carbon atoms, preferably hydrocarbons having 2 to 6 carbon atoms. As examples of suitable light hydrocarbons may be mentioned methane, ethane, propane, butane, pentane, hexane, ethylene, propylene, butylene, isobutane, isopentane, amylene, isoamylene, hexylene, iso-hexane, cyclo-hexane or any mixtures of these. Materials containing substantial proportions of these light hydrocarbons may also be used.

The gases derived from a cracking or destructive hydrogenation process, and the gases derived from the stabilization or debutanization of gasoline provide especially convenient and suitable sources of the light hydrocarbons for use in the present process.

The method of carrying out the process will be fully understood from the following description read with reference to the accompanying drawing which is a semi-diagrammatic view in sectional elevation of a type of apparatus suitable for the purpose.

For convenience in description the light hydrocarbon solvent will be referred to as "propane" but it should be understood that this does not limit the process to propane only. Similarly the initial material to be treated will be referred to as "oil" but this does not limit the process to any particular type of hydrocarbon oil.

Referring to the drawing numeral 1 designates supply tanks of propane, numeral 2 designates a supply tank for oil to be treated, and numerals 3, 4 and 5 designate treating chambers adapted to withstand high temperatures and high pressures. Treating chambers 3, 4 and 5 are provided with heating coils 6, 7 and 8 respectively adapted to be supplied with steam or other suitable heating media by means of which the temperature in the towers may be maintained and regulated. Heat may also be supplied by other means as by introducing water or steam directly into the chambers or by supplying heat to the outside thereof.

Pump 9 draws propane from propane tank 1 through line 10 and forces it under pressure through line 11 into treating chamber 3. Pump 12 draws oil from tank 2 through line 13 and forces it under high pressure through lines 14 and 11 also into treating chamber 3. The temperature in chamber 3 is brought up to the critical temperature of propane or above by means of coil 6 supplied with steam. The pressure maintained in chamber 3 is sufficiently high to cause substantially all of the propane and oil to be completely miscible at the temperature maintained.

Heavy tarry or asphaltic bodies are precipitated and are withdrawn from chamber 3 through line 15.

The liquid in chamber 3 is then withdrawn therefrom through line 16, flows past pressure release valve 16a and is introduced into a second treating chamber 4 maintained under a lower pressure than chamber 3 and at substantially the same or a higher temperature. The decreased pressure in chamber 4 causes an expansion of the mixture therein and the oil-propane solution thereby loses its power to dissolve the heavier fractions of the oil with the result that two oil layers are formed. The further decrease in pressure causes the oil to be distributed between two liquid layers again.

The bottom layer is withdrawn through line 17. The upper layer is withdrawn through line 18, flows past pressure release valve 18a and is introduced into a third treating chamber 5 maintained under a lower pressure than chamber 4 and under substantially the same or a higher temperature than chamber 3.

The bottom layer is removed from chamber 5 through line 19. The upper layer in chamber 5 is withdrawn therefrom through line 20, and after reduction in pressure at pressure release valve 20a, may be introduced into further treating chambers (not shown) or, if chamber 5 is the final treating chamber, is introduced into separation chamber 21 which is maintained at substantially the critical temperature and pressure of propane.

Under these conditions the propane is substantially completely immiscible with the oil and a separation of the final refined oil and propane occurs. The oil layer contains some dissolved propane which may be recovered by distillation or other means.

The oil layer is withdrawn from separation chamber 21 through line 22. The propane layer is withdrawn from separation chamber 21 through line 23, passed through cooler 24 and then returned by means of pump 25 and line 26 to the propane supply tank 1. Alternatively, and more conveniently, the propane layer from separation chamber 21 may be withdrawn through line 23 and then returned while still at high temperature by means of pump 27 and line 28 directly into the first treating chamber 3.

Various modifications in the method of operating the apparatus may be made as will be understood. For example, the necessary heating may be accomplished in heating coils through which the mixture of oil and propane is passed prior to introducing into the treating chambers. In this event the treating chambers would in effect be settling chambers only.

The bottom layers drawn off from treating chambers 4 and 5 through lines 17 and 19 respectively may be recycled to the next preceding treating chambers through dotted lines 17a and 19a. In this way the process would produce only two products, asphalt at one end and refined oil at the other.

The heavy asphalt or oil withdrawn through lines 15, 17, 19 and 22 will contain some dissolved propane. This may be substantially completely removed and recovered by reducing pressure to about 140 lbs./sq. in. and the vapors of propane so evolved may be condensed at about 80° F. The last traces of propane may be removed by blowing with steam at about 212° F. It will be understood that if solvents heavier than propane are used, these may be removed by distillation.

In the operation of the process the more important variables are (1) the temperature at which the treatment is carried out; (2) the pressure maintained during the treatment; (3) the proportion of light hydrocarbon solvent to oil; (4) the composition of the light hydrocarbon solvent and (5) the type of initial material selected for treatment.

In general the temperature of treatment should be above the melting point of the oil to be treated but below the cracking temperature thereof. More specifically the temperature maintained should be substantially the critical temperature of the light hydrocarbon solvent or higher. The temperature is preferably maintained as close to the critical temperature as possible in order to obtain the maximum solubility of the gas in the oil under the pressures used, for it will be understood that as the temperature is increased the solubility of the gaseous propane in the oil decreases. The critical temperatures of some of the preferred light hydrocarbons are as follows:

| Hydrocarbon | Critical temperature |
|---|---|
| | ° F. |
| Ethane | 93 |
| Propane | 212 |
| Butane | 304 |
| Pentane | 387 |
| Hexane | 455 |
| Heptane | 513 |

It will be seen that the practical temperature range over which the treatment may be carried out will therefore be between about 100° F. and 500° F. Most oils will have melting points that fall well within this range even at the lower end, and cracking temperatures above the upper end of the range. It will be understood that the particular temperature used will depend upon what light hydrocarbon is selected.

The pressure maintained during the treatment will be between the critical pressure of the light hydrocarbon and a pressure at which a substantial amount of the liquefied hydrocarbon will be dissolved in the oil at the temperature of working This latter pressure will generally be about twice the critical pressure.

The critical pressures of the preferred light hydrocarbons are as follows:

| Hydrocarbon | Critical pressure |
|---|---|
| | Lbs./sq. in. |
| Ethane | 750 |
| Propane | 690 |
| Butane | 555 |
| Pentane | 495 |
| Hexane | 450 |

It will be seen therefore that the lower pressure limit maintained in vessel 21 may vary from about 400 lbs./sq. in. to substantially above 700 lbs./sq. in. The exact pressure necessary in any particular case will depend upon the particular light hydrocarbon selected and upon the temperature at which it is used.

The volume of light hydrocarbon solvent used determines to a large extent the yield of treated oil, that is to say, since the upper layer will always be saturated with light hydrocarbon, the greater the quantity of light hydrocarbon used, the greater will be the amount of oil found in the upper layer. In general, from 2 to 6 pounds of solvent per pound of oil will give satisfactory results, although from 3 to 4 pounds of solvent per pound of oil are preferred in most cases.

The particular light hydrocarbon selected for use will depend primarily on the nature of the oil to be treated, and more particularly on the melting point and the cracking temperature thereof which represent the minimum and maximum temperatures respectively that should be used. Thus, in the case of very light oils it is preferable to use light hydrocarbon such as ethane, propane and butane. Similarly with the heavier types of oils, light hydrocarbons such as propane and butane are preferable although pentane, hexane and heptane are quite satisfactory.

It has been found that all hydrocarbons having between 1 and 8 carbon atoms have substantially the same density at their respective critical temperatures. Thus, for example, if a particular solvent density is required to accomplish the degree of separation desired, any one of these light hydrocarbons or any mixture thereof may be used, provided other conditions are met, and the required density may be obtained by adjusting the temperature and pressure at which the particular light hydrocarbon or mixture of light hydrocarbons is used. It should also be understood that a suitable light hydrocarbon solvent for use according to this invention may comprise a mixture of hydrocarbons having between 1 and 8 carbons with higher boiling hydrocarbons in which the hydrocarbons having between 1 and 8 carbon atoms constitute the major proportion. Such mixtures would preferably comprise a substantial proportion of hydrocarbons of 1, 2 or 3 carbon atoms. Thus, for example, a mixture of ethane and decane in which ethane constituted the major proportion would provide a suitable solvent because the density of this mixture could be made substantially the same as the density of pure butane or pentane by suitable adjustment of temperature and pressure. Similarly other mixtures of the light hydrocarbons with hydrocarbons having more than 8 carbon atoms could be prepared. The important factor is the density of the light hydrocarbon solvent. Once this density is determined, a wide variety of mixtures can be prepared which will have this density under suitable conditions of temperature and pressure.

The process has been described as being carried out in a series of treaters but it will be understood that it may also be carried out in batch operation in a single treater.

The initial material may be preliminarily or subsequently subjected to various treatments. Thus, the oil may first be deasphaltized, dewaxed and filtered or contacted with clay, and if this is to be done it is advantageous to use light hydrocarbons such as propane for the purpose since the light hydrocarbon is to be used in the subsequent treatment according to the present process, although other methods of deasphaltizing and dewaxing may also be used as will be understood.

The usual finishing and refining treatments may also be applied to the products prepared according to this process.

The initial material may be subjected to hydrogenation, cracking, voltolization or polymerization and condensation treatments either prior to or subsequent to the high temperature treatment.

The several extracts obtained during the extraction may be maintained separate, or may be blended in suitable proportions with each other or with oils derived from other sources.

In many cases it is advantageous and desirable to use selective solvents for naphthenic and aromatic hydrocarbons in addition to and together with the light hydrocarbon solvents. Among such solvents may be mentioned phenols, cresols, xylols, cresylic acid, nitrobenzene, aniline, chloraniline, furfural, liquid sulfur dioxide, dichlorethyl ether, croton aldehyde, pyridine, benzaldehyde, nitrotoluene, furfuryl alcohol and methyl cellosolve.

One marked advantage of the present method of treating oils with light hydrocarbons at or above the critical temperature of the light hydrocarbons is that by a mere doubling of the pressure at this temperature a great change in the solubility of the light hydrocarbon in the oil may be effected. Thus when using propane, only a small amount of propane will dissolve in the oil at 212° F., the critical temperature of propane, and about 650 lbs./sq. in. the equilibrium vapor pressure of propane at just below its critical temperature. If the temperature is maintained at 212° F. and the pressure increased to say 1300 lbs./sq. in. sufficient propane will dissolve in the oil to cause the latter to be separated into two fractions.

Increasing the pressure is an extremely simple and inexpensive operation, and by means of doing so a tremendous change in the characteristics and effect of the solvent may be obtained. It will be understood that the cost of compression depends upon the change in volume. By doubling the pressure at the critical temperature the volume change is only 2 to 1. Doubling the pressure in the range of 100 lbs./sq. in. would have less effect.

This invention is not limited by any theories of the mechanism of the reactions nor by any details which have been given merely for purposes of illustration, but is limited only in and by the following claims in which it is my intention to claim all novelty inherent in the invention.

I claim:

1. Process for separating a lubricating fraction of petroleum into constituent parts which comprises diluting the lubricating fraction with a light hydrocarbon solvent, bringing the diluted oil to the critical temperature and pressure of the light hydrocarbon solvent, then increasing the pressure to substantially above the critical pressure, removing any material remaining undissolved, reducing the pressure whereby the liquid phase is separated into two layers, removing the bottom layer, reducing the pressure on the upper layer whereby it is again separated into two layers, removing the bottom layer, and finally reducing the pressure on the upper layer to the critical pressure of the light hydrocarbon solvent whereby the oil and light hydrocarbon become substantially insoluble in each other, and recovering the oil layer therefrom.

2. Process according to claim 1 in which the light hydrocarbon solvent comprises propane.

3. Process according to claim 1 in which the light hydrocarbon solvent comprises propane and the pressure is progressively reduced from about 1300 lbs./sq. in. to about 650 lbs./sq. in. while the temperature is maintained at approximately 212° F.

4. Process according to claim 1 in which selective solvents of the class comprising phenols, cresols, xylols, cresylic acid, nitrobenzene, aniline, chloraniline, furfural, liquid sulfur dioxide, dichlorethyl ether, croton aldehyde and pyridine are used together with the light hydrocarbon solvent.

5. Process according to claim 1 in which selective solvents for naphthenic and aromatic hydrocarbons are used together with the light hydrocarbon solvent.

6. Process according to claim 1 in which the treatment is carried out in a continuous countercurrent manner in which the bottom layer from each tower except the first is continuously returned to the next preceding tower.

7. A process for separating a high-molecular mixture the constituents of which are totally miscible at the temperature of the process into portions having different properties, comprising the steps of subjecting said mixture, together with a quantity of a low-molecular treating agent, to temperature and pressure conditions at which said treating agent is in its para-critical state said temperature being above the critical temperature of said low molecular treating agent and at least a portion of the mixture is dissolved in the treating agent, thereby forming a liquid phase containing a treating agent and dissolved high-molecular substances, reducing the pressure under conditions causing a decrease in the density of the treating agent in said liquid phase, thereby causing the precipitation of a portion of the dissolved high-molecular substances from the liquid phase to form a separate heavier phase, and separating the resulting phases, the reduced pressure being sufficient to prevent all of the dissolved high-molecular substances from being precipitated and the temperature being below the paracritical temperature range for said high molecular mixture.

8. The process according to claim 7, in which the expansion of the dissolved mixture is carried out isothermally.

9. The process according to claim 7, in which the high-molecular mixture is an asphalt-free hydrocarbon oil.

10. A process for separating a high-molecular mixture the constituents of which are totally miscible at the temperature of the process into portions having different properties, comprising the steps of mixing said mixture with a quantity of a low-molecular treating agent, subjecting the resulting mixture to a temperature and pressure at which said low-molecular treating agent is in its para-critical state said temperature being above the critical temperature of said low molecular treating agent and a portion of the mixture is dissolved in the treating agent, thereby forming a light liquid phase containing a treating agent and dissolved high-molecular substances, and a heavier phase containing undissolved high-molecular substances, removing said heavier phase from the light liquid phase, reducing the pressure on the light liquid phase under conditions causing a decrease in the density of the treating agent in the light liquid phase, thereby causing the precipitation of a portion of the dissolved high-molecular substances to form a heavier phase, and separating the resulting phases, the reduced pressure being sufficient to prevent all of the high-molecular substances from being precipitated and the temperature being below the paracritical temperature range for said high molecular mixture.

11. A process for separating a high-molecular mixture the constituents of which are totally miscible at the temperature of the process into portions having different properties, comprising the steps of mixing the said mixture with a quantity of a low-molecular treating agent which at elevated pressures and in its paracritical state is miscible with at least a portion of the mixture and is incapable of reacting chemically therewith, and having a low enough critical temperature to cause certain components of the dissolved high-molecular mixture to become insoluble therein upon a decrease in the density of the treating agent in the para-critical state while certain other components remain dissolved therein, subjecting the resulting mixture of treating agent and high-molecular mixture to temperature and pressure conditions at which said treating agent is in its paracritical state said last-mentioned temperature being above the critical temperature of said low molecular treating agent and at least a portion of the high-molecular mixture is dissolved therein, thereby forming a liquid phase, reducing the pressure on said phase under conditions causing a decrease in the density of the treating agent in said liquid phase, thereby causing the precipitation of a portion of the dissolved high-molecular substances from the liquid phase to form a separate heavier phase, and separating the resulting phases, the reduced pressure being sufficient to prevent the formation of a phase having a density lower than the critical density of the treating agent and the precipitation of all of the dissolved high-molecular substances and the temperature being below the paracritical temperature range for said high molecular mixture.

12. The process according to claim 11 in which the high-molecular mixture is dissolved in a mutual solvent for the high-molecular mixture and the treating agent, said mutual solvent having a critical temperature high enough to be present in its normal liquid state at the temperature of the treatment.

13. A process for separating a high-molecular mixture the constituents of which are totally miscible at the temperature of the process into a plurality of portions having different properties, comprising the steps of subjecting said mixture, together with a quantity of a low-molecular treating agent, to temperature and pressure conditions at which said treating agent is in its paracritical state said temperature being above the critical temperature of said low molecular treating agent and at least a portion of the mixture is dissolved in the treating agent, thereby forming a primary liquid phase containing treating agent and dissolved high-molecular substances, reducing the pressure on the primary liquid phase under conditions causing a decrease in the density of the treating agent in said liquid phase, thereby causing the precipitation of a portion of the dissolved high-molecular substances and the formation of a secondary light liquid phase and a secondary heavier phase, separating said phases, reducing the pressure on the separated secondary light liquid phase under conditions causing a further decrease in the density of the treating agent in the secondary light liquid phase, thereby causing the precipitation of a portion of the high-molecular substances dissolved therein to form a tertiary light liquid phase and tertiary heavier phase, and separating the tertiary heavier phase from the tertiary light liquid phase, the reduced pressure at which the tertiary phases are formed being sufficient to prevent the precipitation of all of the dissolved high-molecular substances and the temperature being below the paracritical temperature range for said high molecular mixture.

14. In a continuous process for separating a high-molecular mixture the constituents of which are totally miscible at the temperature of the process into a plurality of portions having different properties, the steps of continuously subjecting successive portions of said high-molecular mixture and a low-molecular treating agent, to temperature and pressure conditions at which said treating agent is in its para-critical state, said temperature being above the critical temperature of said low molecular treating agent, said high molecular mixture is below its paracritical temperature range and at least a portion thereof is dissolved in the treating agent, thereby forming a primary liquid phase containing treating agent and dissolved high-molecular substances, continuously introducing said primary liquid phase into a first chamber at a reduced pressure under conditions causing a decrease in the density of the treating agent in said liquid phase, thereby causing the precipitation of a portion of the dissolved high-molecular substances and the formation of a secondary light liquid phase and a secondary heavier phase, continuously withdrawing at least the secondary light liquid phase and introducing it into a second chamber at a pressure lower than the pressure in the first chamber under conditions causing a decrease in the density of the secondary light liquid phase, thereby causing the precipitation of a portion of the dissolved high-molecular substances and the formation of a tertiary light liquid phase and a tertiary heavier phase, and continuously withdrawing at least the tertiary light liquid phase from the second chamber, the pressure in the second chamber being sufficient to prevent the precipitation of all of the dissolved high-molecular substances.

15. In a continuous process for separating a high-molecular mixture the constituents of which are totally miscible at the temperature of the process into several portions having different properties, the steps of subjecting said mixture together with a quantity of a low-molecular treating agent to temperature and pressure conditions at which said agent is in its paracritical state said temperature being above the critical temperature of said low molecular treating agent, said high molecular mixture is below its paracritical temperature range and at least a portion thereof is dissolved in the treating agent, thereby forming a light liquid phase containing a treating agent and dissolved high-molecular substances, continuously reducing the pressure on said light liquid phase under conditions causing a gradual decrease in the density of the treating agent in said light liquid phase, thereby continuously precipitating successive portions of the dissolved high-molecular substances to form an additional heavier phase, and continuously removing the precipitated heavy phase from the said light liquid phase.

16. The process according to claim 15, characterized in that the heavier phase is run off to different receiving vessels in the course of the treatment, whereby a plurality of products of different properties are obtained.

17. A process for separating a hydrocarbon material containing normally gaseous and higher molecular weight hydrocarbons into portions having different properties comprising the steps of reducing the pressure on said mixture at a temperature above the crtical temperature of said normally gaseous hydrocarbon from a high superatmospheric pressure at which said material exists as a fluid phase having a density greater than the critical density of the normally gaseous hydrocarbon to a lower superatmospheric pressure under conditions causing a decrease in the density of the normally gaseous hydrocarbon, thereby precipitating a portion of said hydrocarbon material to form a heavier, liquid phase, and separating the resulting heavier, liquid phase from the unprecipitated portion of said hydrocarbon material.

18. The process of separating heavier fractions from a hydrocarbon oil containing same which comprises subjecting said oil together with a light hydrocarbon solvent to a temperature at least as high as the critical temperature of the light hydrocarbon solvent and a pressure sufficiently above the critical pressure of said light hydrocarbon solvent to keep said light hydrocarbon solvent dissolved as a liquid phase in the hydrocarbon oil, comprising reducing the pressure to cause the heavier oil fractions to form a bottom oil layer, said pressure being still above the critical pressure of the light hydrocarbon solvent, and separating said heavy oil layer from the upper oil layer containing dissolved light hydrocarbon solvent.

19. The process of separating heavier fractions from a hydrocarbon oil containing same which comprises subjecting said oil together with a light hydrocarbon solvent to a temperature at least as high as the critical temperature of the light hydrocarbon solvent and a pressure sufficiently above the critical pressure of said light hydrocarbon solvent to keep said light hydrocarbon solvent dissolved as a liquid phase in the hydrocarbon oil, comprising reducing the pressure on said mixture in at least two stages down to the critical pressure while maintaining the temperature at least as high as the critical temperature, during at least the first of said pressure-reducing stages separating heavier fractions of oil which settle out from the mixture as a bottom layer, and when the pressure is reduced to the critical pressure of the light hydrocarbon solvent separating oil from the latter.

20. Process according to claim 19 in which the hydrocarbon oil treated is an oil at least as heavy as gas oil, the light hydrocarbon solvent is a hydrocarbon having 2 to 6 carbon atoms, 2–6 lbs. of solvent being used per pound of oil, and the process is carried out at a temperature of about 100–500° F. and a pressure of 2 to 1 times the critical pressure of the light hydrocarbon solvent.

21. Process according to claim 19 in which the temperature is maintained as close to the critical temperature of the light hydrocarbon solvent as possible throughout the entire process.

22. A process for separating a hydrocarbon oil into fractions of dissimilar characteristics, comprising the steps of subjecting said mixture together with a quantity of light hydrocarbon solvent, to temperature and pressure conditions above the critical temperature and pressure of said light hydrocarbon solvent and at which at least a portion of the mixture is dissolved in the solvent, thereby forming a liquid phase containing a solvent and dissolved hydrocarbon oil, reducing the pressure under conditions causing an expansion of the mixture, thereby resulting in the formation of two oil layers, the heavier fractions of the hydrocarbon oil forming a separate heavier phase as bottom layer, and separating the resulting layers, the reduced pressure being sufficient to prevent all of the dissolved hydrocarbon oil substances from sepaarting out from the light hydrocarbon solvent solution thereof and the temperature being above the melting point of said hydrocarbon oil but below the cracking temperature thereof.

23. The process for separating a hydrocarbon oil mixture, the constituents of which are totally miscible at the temperature of the process, into fractions of dissimilar characteristics, comprising the steps of mixing said mixture with a quantity of a light hydrocarbon solvent, subjecting the resulting mixture to a temperature and pressure above the critical temperature and pressure of said light hydrocarbon solvent, a portion of the mixture being dissolved in the solvent, thereby forming a light liquid phase containing the solvent and dissolved hydrocarbon oil substances, and a heavier phase containing undissolved hydrocarbon oil substances, removing said heavier phase from the light liquid phase, reducing the pressure on the light liquid phase under conditions causing an expansion of said mixture, thereby causing a portion of the dissolved hydrocarbon oil substances to settle out as a heavier oil layer, and separating the resulting layers, the reduced pressure being sufficient to prevent all of the hydrocarbon oil substances from being precipitated and the temperature being above the melting point of, but below the cracking temperature of, said hydrocarbon oil mixture.

24. A process for separating a hydrocarbon oil mixture, the constituents of which are totally miscible at the temperature of the process, into a plurality of fractions of dissimilar characteristics, comprising the steps of subjecting said mixture together with a quantity of a light hydrocarbon solvent, to temperature and pressure conditions at which said solvent is above its critical temperature and pressure and at least a portion of the mixture is dissolved in the solvent, thereby forming a primary liquid phase containing solvent and dissolved hydrocarbon substances, reducing the pressure on the primary liquid phase under conditions causing an expansion of said liquid phase mixture, thereby causing a portion of the hydrocarbon oil substances to settle out as a bottom oil layer, thus forming a secondary light liquid layer and a secondary heavier oil layer, separating said layers, reducing the pressure on the separated secondary light liquid layer under conditions causing a further expansion of said light liquid mixture, thereby causing a portion of the hydrocarbon oil substances dissolved therein to settle out as a tertiary heavier phase leaving as upper layer a tertiary light liquid phase, and separating the tertiary heavier phase from the tertiary light liquid phase, the reduced pressure at which the tertiary phases are formed being sufficient to prevent precipitation of all of the dissolved hydrocarbon oil substances and the temperature being above the melting point of, but below the cracking temperature of, said hydrocarbon oil mixture.

WARREN K. LEWIS.